United States Patent [19]

Nemoto

[11] Patent Number: 5,584,500
[45] Date of Patent: Dec. 17, 1996

[54] AIR BAG MOUNTING STRUCTURE WITH THREE PLACE CLAMPING

[75] Inventor: Hiroshi Nemoto, Mesa, Ariz.

[73] Assignee: TRW Inc., Lyndhurst, Ohio

[21] Appl. No.: 421,735

[22] Filed: Apr. 13, 1995

[51] Int. Cl.⁶ .................................................. B60R 21/16
[52] U.S. Cl. ........................ 280/728.2; 280/731
[58] Field of Search .................... 280/728.1, 728.2, 280/731, 732, 741

[56] References Cited

U.S. PATENT DOCUMENTS

| | | |
|---|---|---|
| 3,819,205 | 6/1974 | Dunford et al. . |
| 3,895,823 | 7/1975 | Stephenson . |
| 5,295,706 | 3/1994 | Morita .................................. 280/728.2 |
| 5,314,203 | 5/1994 | Adams et al. ........................ 280/728.2 |
| 5,348,340 | 9/1994 | Humphreys et al. ................. 280/728.2 |
| 5,409,256 | 4/1995 | Gordon et al. ....................... 280/728.2 |
| 5,421,607 | 6/1995 | Gordon ................................. 280/728.2 |
| 5,470,100 | 11/1995 | Gordon ................................. 280/728.2 |

*Primary Examiner*—Paul N. Dickson
*Attorney, Agent, or Firm*—Tarolli, Sundheim, Covell, Tummino & Szabo

[57] ABSTRACT

An apparatus (20) for attaching an air bag (22) and an inflator (24) to a vehicle steering wheel (26) comprises a mounting plate (28) which is connectable with the steering wheel. The air bag (22) has a mounting portion (44) which encircles an inlet opening (46) into the air bag. A bag ring (162) clamps the mounting portion (44) of the air bag (22) and a flange (104) on the inflator (24) between the bag ring and the mounting plate (28). Only three fasteners (168) substantially equally spaced about a central axis (C) of the bag ring (162) secure the mounting plate (28) and bag ring (162) together to clamp the inflator flange (104) and mounting portion (44) of the air bag (22) between the mounting plate (28) and bag ring (162).

12 Claims, 3 Drawing Sheets

AIR BAG MOUNTING STRUCTURE WITH THREE PLACE CLAMPING

BACKGROUND OF THE INVENTION

1. Technical Field

The present invention relates to an inflatable vehicle occupant restraint such as an air bag and, in particular, the present invention relates to a structure for attaching an inflatable air bag to a part of a vehicle.

2. Description of the Prior Art

Various structures are known for attaching an air bag to a part of a vehicle, such as a steering wheel. One such structure is disclosed in U.S. Pat. No. 3,895,823. The structure of U.S. Pat. No. 3,895,823 includes two fasteners connecting an air bag inflator and an air bag to a retaining plate. The retaining plate is attachable to a vehicle steering wheel. In U.S. Pat. No. 5,314,203, four fasteners spaced approximately 90° apart secure an air bag and an air bag inflator to a vehicle steering wheel.

SUMMARY OF THE INVENTION

The present invention is directed to a structure for attaching an inflatable vehicle occupant restraint, such as an air bag, to a part of a vehicle, such as a steering wheel. The structure provides simple, reliable and economical attachment of the air bag.

The structure of the present invention includes a mounting plate attachable to a vehicle steering wheel. An inflatable air bag has a mounting portion in which three openings are formed. A bag ring has a central axis and clamps the mounting portion of the air bag. Only three fasteners, which are substantially equally spaced about the central axis of the bag ring, extend through the three openings in the mounting portion of the air bag and secure the mounting plate and bag ring together. The mounting portion of the air bag is, thus, clamped between the bag ring and mounting plate.

The mounting portion of the air bag surrounds an opening in the air bag. An air bag inflator projects, in part, into the air bag through the opening in the mounting portion. The inflator provides inflation fluid for inflating the air bag.

The mounting plate is attachable to a vehicle steering wheel. The mounting plate has an a surface defining a recess. The recess receives a flange on the air bag inflator. The bag ring clamps the mounting portion of the air bag between the bag ring on one side of the air bag mounting portion and the mounting plate and the flange of the inflator on another side of the air bag mounting portion.

Each fastener preferably comprises a stud fixed to the bag ring. Three openings are formed in the mounting plate. Each of the openings in the mounting plate receives a respective stud.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF PREFERRED EMBODIMENT

Figure 1:
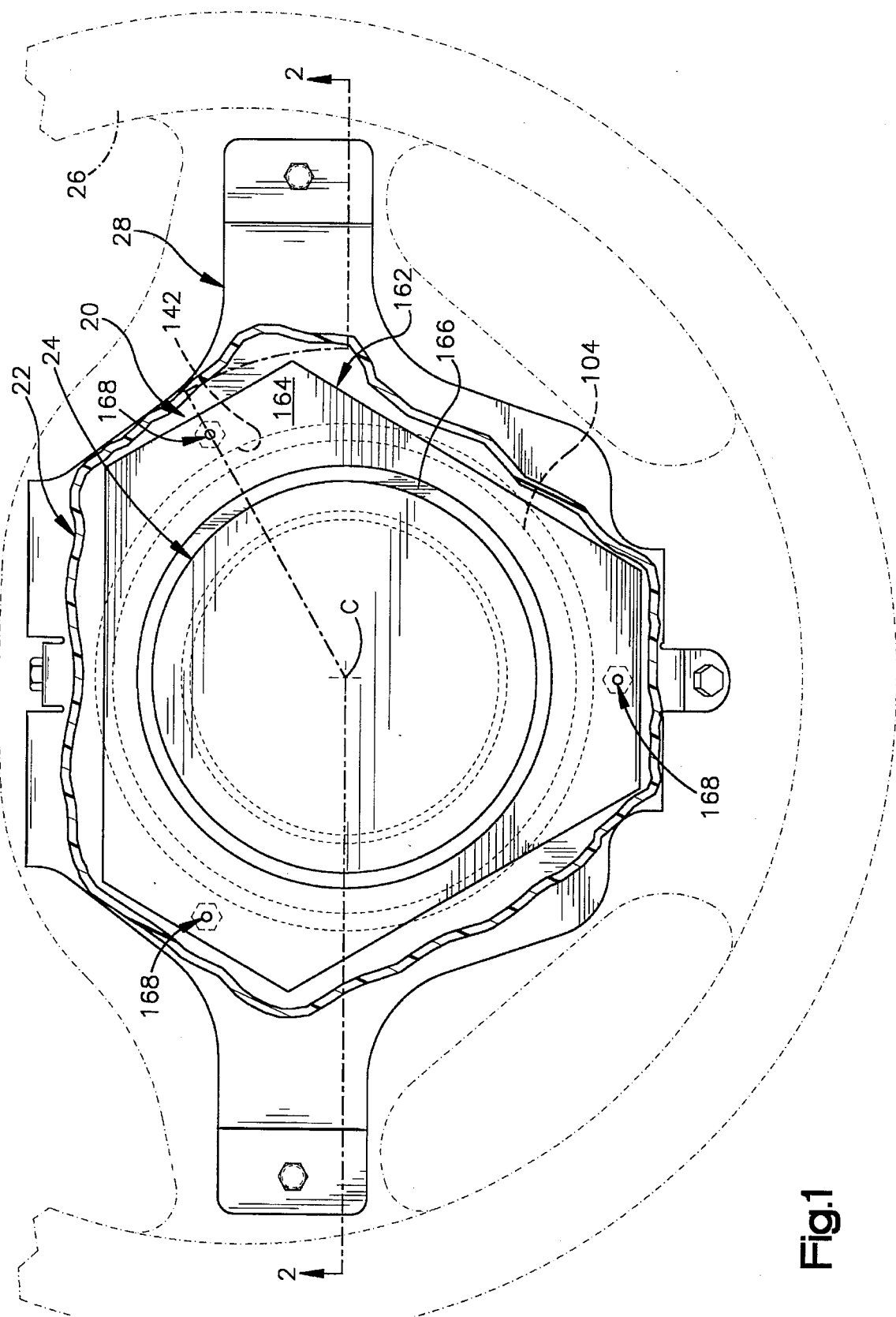
FIG. 1 is a top plan view of a structure embodying the present invention.
Figure 2:
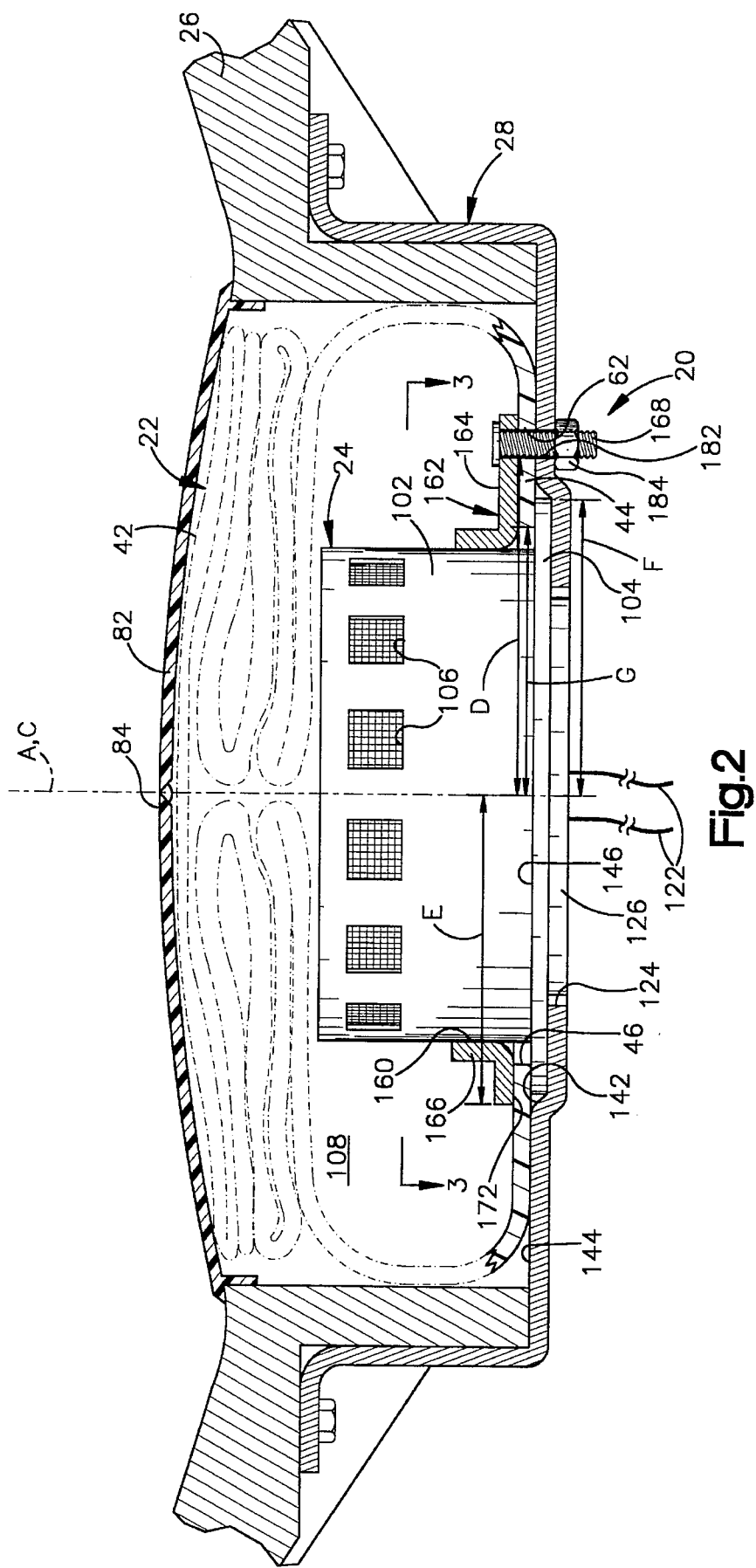
FIG. 2 is an enlarged cross-sectional view of the structure of FIG. 1, taken approximately along line 2—2 in FIG. 1.

A mounting structure 20 is illustrated in FIGS. 1 and 2 for attaching an inflatable vehicle occupant restraint, such as an air bag 22, and an associated air bag inflator 24 to a part of a vehicle, such as a steering wheel 26. The mounting structure 20 includes a mounting plate 28 which may be an integral part of the steering wheel 26 or a separate part, as illustrated in FIGS. 1 and 2. It will be apparent that while the mounting structure 20 is illustrated for use with a steering wheel for a driver's side air bag, the mounting structure can be adapted for use with other air bags, such as side impact air bags and passenger side air bags.

The air bag 22 includes an expandable portion 42 (FIG. 2) which inflates to cushion and restrain movement of a vehicle occupant relative to structural parts of the vehicle upon sudden vehicle deceleration above a predetermined deceleration, such as occurs in a collision. The air bag 22 may be made of any suitable material. The air bag 22 also includes a mounting portion 44 which encircles an inlet opening 46. The inlet opening 46 of the air bag 22 is preferably circular and the mounting portion 44 is preferably annular. Three mounting openings 62 are formed in a circumferential array and are evenly spaced around the mounting portion 44 of the air bag 22.

When the air bag 22 is attached to the steering wheel 26, the air bag is housed within a cover 82. The cover 82 is mounted on the steering wheel 26 and has at least one seam 84 or otherwise weakened area which breaks to permit the air bag 22, as it expands during inflation, to expand into the passenger compartment of the vehicle.

The inflator 24 may be of any suitable type known in the art. The inflator 24 has a cylindrical housing 102 with a longitudinal central axis A. A transversely extending mounting flange 104 extends from the cylindrical housing 102. The mounting flange 104 is located near an axial lower end portion of the inflator 24, as viewed in FIG. 2.

The inflator 24 also includes a plurality of discharge openings 106 formed in the housing 102 at an axial end portion opposite the mounting flange 104. The openings 106 allow inflation fluid to flow from within the inflator 24 in a dispersed or diffused manner into an interior portion 108 of the air bag 22 to inflate and expand the air bag to a desired pressure and volume for cushioning and restraining the vehicle occupant.

The inflator 24 is actuatable to provide a flow of the inflation fluid into the air bag 22. The inflator 24 includes an actuatable igniter (not shown) that is electrically connected by lead wires 122 in an electrical circuit that includes a sensor (not shown) which determines that the conditions exist for actuating the igniter to effect the flow of inflation fluid into the air bag.

The mounting plate 28 is of a suitable size and configuration which is determined by the size and shape of the steering wheel. The mounting plate 28 is preferably made from a metal material, such as steel or aluminum. The mounting plate 28 includes an opening 124 through which the lead wires 122 and a base portion 126 of the inflator 24 extend. The opening 124 is preferably circular.

A recess 142 is formed in the mounting plate 28 adjacent the opening 124 by having an annular portion of the mounting plate axially offset from, but generally parallel to an adjacent portion of the mounting plate. The recess 142 is sized to accept the flange 104 of the inflator 24 and locates the inflator relative to the mounting plate 28. The recess 142 has a radius which matches the radius F of the flange 104.

Thus, the inflator 24 is located in a predetermined position both axially and radially in the mounting plate 28. The predetermined position is preferably where the longitudinal central axis A of the inflator 24 coincides with the center of the opening 124.

The depth of the recess 142 preferably equals the thickness of the flange 104 of the inflator 24. Thus, an upper surface 144 of the mounting plate 28 and an upper surface 146 of the inflator flange 104 are contained in substantially the same plane. The downwardly facing surface of the mounting portion 44 of the air bag 22 engages the surfaces 144 and 146. The mounting plate 28 includes three openings 182 in a circumferential array about the recess 142.

Figure 3:
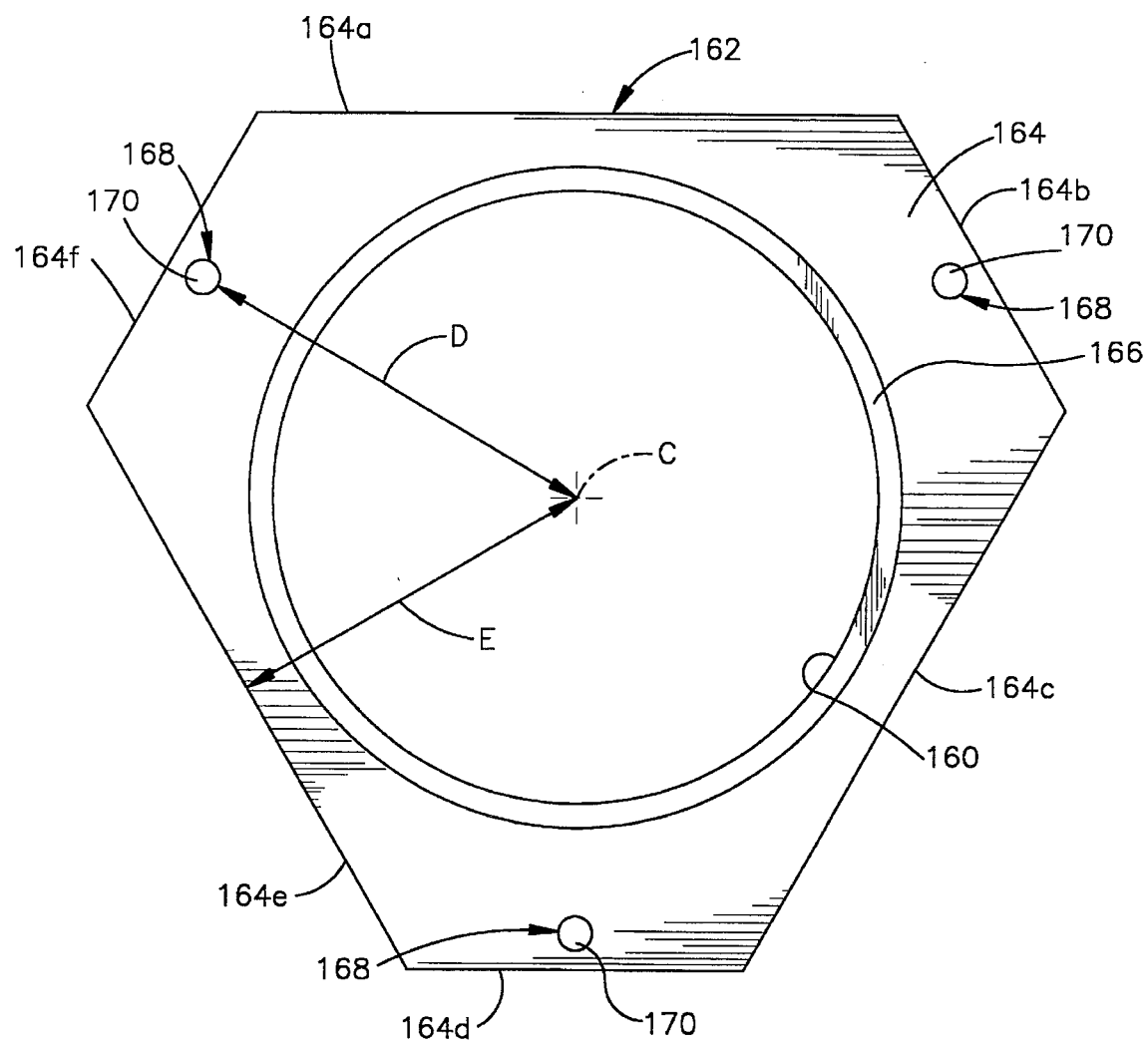
FIG. 3 is a plan view of a part of the structure of FIG. 1.

The mounting structure 20 also includes a bag ring 162 with a central axis C. The bag ring 162 has a radially outer flange portion 164 and a radially inner cylindrical portion 166 that defines a circular opening 160 (FIG. 3). The bag ring 162 is preferably made of metal and is of a suitable configuration and size for clamping the mounting portion 44 of the air bag 22 against the mounting plate 28 and against the inflator flange 104.

The flange portion 164 of the bag ring 162 has an outer perimeter defined by six straight sides 164a, 164b, 164c, 164d, 164e and 164f, as shown in FIG. 3. The sides 164b, 164d and 164f are of the same length. The sides 164a, 164c and 164e are also of the same length and are longer than the sides 164b, 164d and 164f.

The flange portion 164 of the bag ring 162 also has a planar surface 172 (FIG. 2) which extends normal to the central axis C of the bag ring and engages an upwardly facing surface of the mounting portion 44 of the air bag 22. The mounting portion 44 of the air bag 22 is, thus, engaged on both of its sides by a relatively flat surface.

The inflator housing 102 extends through the opening 160 in the bag ring 162. The cylindrical portion 166 of the bag ring 162 extends from the flange portion 164 substantially parallel to the axis C to engage and provide radial support for the cylindrical housing 102 of the inflator 24. The inflator housing 102 also extends through the inlet opening 46 of the air bag 22. The radius G of the inlet opening 46 of the air bag 22 is smaller than the radially outermost extent E of the radially smallest portion of the flange 164 of the bag ring 162 so the flange engages the mounting portion 44 of the air bag.

Three studs 168 or other suitable fasteners have a respective head 170 which is fixed to the flange portion 164 of the bag ring 162 in a suitable manner, such as by spot welding. The threaded portions of the studs 168 extend in a direction substantially parallel to the axis C of the bag ring. The studs 168 are located adjacent the centers of sides 164b, 164d, and 164f of the perimeter of the bag ring 162. The studs 168 are located in an evenly spaced circumferential array about the longitudinal central axis C of the bag ring 162.

The inside radius D of the circumferential array of the studs 168 is greater than the outside radius F of the flange 104 of the inflator 24 so the studs do not extend through the flange. The size and shape of the openings 182 in the mounting plate 28 and of the openings 62 in the mounting portion 44 of the air bag 22 and the diameter of the circumferential array of openings 182 and opening 62 correspond to the size, shape and diameter of the array of studs 168. The threaded portion of each of the studs 168 extends through a respective one of the openings 62 in the mounting portion 44 of the air bag 22 and through a respective one of the openings 182 in the mounting plate 28.

A nut 184 is threaded onto each stud 168 extending from the bag ring 162. Each nut 184 is tightened to a desired torque on the stud 168 and against the mounting plate 28 to clamp the mounting portion 44 of the air bag 22 between the surface 172 of the flange portion 164 of the bag ring 162 and the surfaces 144 and 146 of the mounting plate and inflator flange 104, respectively.

The bag ring 162 transmits the clamping force around the entire mounting portion 44 of the air bag 22 from triangulated regions adjacent each stud 168 and nut 184. The strength of the bag ring 162 is sufficient to distribute the clamping force evenly over the mounting portion 44 of the air bag 22 engaged between the bag ring and the mounting plate 28 and inflator flange 104. This clamping force also maintains the flange 104 of the inflator 24 against the surface defining the recess 142 in the mounting plate 28.

The clamping force is evenly distributed circumferentially around the mounting portion 44 of the air bag 22 also to assure a sufficient fluid seal upon actuation of the inflator 24 so that inflation fluid does not exit between the bag ring 162 and the mounting portion of the air bag. Thus, a relatively simple and reliable mounting of the inflator 24 and a good seal for the air bag 22 is provided.

From the above description of a preferred embodiment of the invention, those skilled in the art will perceive improvements, changes and modifications. Such improvements, changes and modifications within the skill of the art are intended to be covered by the appended claims.

Having described the invention, the following is claimed:

1. An apparatus comprising:

a mounting plate attachable to a vehicle steering wheel;

an inflatable air bag having a mounting portion in which three openings are formed;

a bag ring having a central axis, said bag ring clamping against said mounting portion of said air bag;

only three fasteners substantially equally spaced about the central axis of said bag ring and extending through said three openings in said mounting portion and securing said mounting plate and bag ring together to cause said mounting portion to be clamped between said bag ring and said mounting plate; and an air bag inflator for providing inflation fluid to inflate said air bag and having a flange fixed to said inflator and a recess formed in said mounting plate for receiving said flange to position the inflator relative to the mounting plate;

said mounting portion of said air bag also engaging said flange of said inflator and said bag ring including a portion which clamps said mounting portion against said flange.

2. An apparatus comprising:

an air bag having an opening and a mounting portion surrounding the opening;

an air bag inflator to inflate said air bag and having a flange;

a mounting plate attachable to a vehicle steering wheel, said mounting plate having an opening and a surface defining a recess adjacent the opening, said recess receiving said flange of said air bag inflator;

a bag ring having a central axis, said bag ring clamping said mounting portion of said air bag between said bag ring on one side of said mounting portion and said mounting plate and said flange of said inflator on an opposite side of said mounting portion; and only three fasteners substantially equally spaced in a circumferential array about the central axis of said bag ring for securing said bag ring and mounting plate together to clamp said mounting portion;

said flange of said inflator having an outer radius which is less than the inner radius defined by the circumferential array of said three fasteners.

3. An apparatus comprising:

an air bag having an opening and a mounting portion surrounding the opening;

an air bag inflator to inflate said air bag and having a flange;

a mounting plate attachable to a vehicle steering wheel, said mounting plate having an opening and a surface defining a recess adjacent the opening, said recess receiving said flange of said air bag inflator;

a bag ring having a central axis, said bag ring clamping said mounting portion of said air bag between said bag ring on one side of said mounting portion and said mounting plate and said flange of said inflator on an opposite side of said mounting portion; and only three fasteners substantially equally spaced in a circumferential array about the central axis of said bag ring for securing said bag ring and mounting plate together to clamp said mounting portion;

said mounting portion of said air bag engaging said flange of said inflator and said bag ring including a portion which clamps said mounting portion against said flange.

4. An apparatus comprising:

an air bag having an opening and a mounting portion surrounding the opening;

an air bag inflator to inflate said air bag and having a flange;

a mounting plate attachable to a vehicle steering wheel, said mounting plate having an opening and a surface defining a recess adjacent the opening, said recess receiving said flange of said air bag inflator;

a bag ring having a central axis, said bag ring clamping said mounting portion of said air bag between said bag ring on one side of said mounting portion and said mounting plate and said flange of said inflator on an opposite side of said mounting portion;

said bag ring including a radially extending flange portion having an outer perimeter which is defined by six straight sides, a first three sides of said six sides having a first length and a second three sides of said six sides having a second length which is shorter than said first length, each of said first three sides being disposed between a respective two of said second three sides; and only three fasteners substantially equally spaced in a triangular pattern and centered about the central axis of said bag ring, each of said three fasteners being disposed adjacent one of said second three sides of said bag ring, said three fasteners for securing said bag ring and mounting plate together to clamp said mounting portion.

5. An apparatus comprising:

a mounting plate attachable to a vehicle steering wheel;

an inflatable air bag having a mounting portion in which three openings are formed;

a bag ring having a central axis, said bag ring clamping against said mounting portion of said air bag; and only three fasteners substantially equally spaced about the central axis of said bag ring and which are not diametrically opposed to one another, said three fasteners extending through said three openings in said mounting portion and securing said mounting plate and bag ring together to cause said mounting portion to be clamped between said bag ring and said mounting plate.

6. The apparatus set forth in claim 5 further including an air bag inflator for providing inflation fluid to inflate said air bag and having a flange fixed to said inflator and further including a recess formed in said mounting plate for receiving said flange to position the inflator relative to the mounting plate.

7. The apparatus set forth in claim 5 wherein each of said fasteners comprises a stud fixed to said bag ring.

8. The apparatus set forth in claim 5 further including three openings formed in said mounting plate, each of said openings receiving a respective one of said fasteners.

9. An apparatus comprising:

an air bag having an opening and a mounting portion surrounding the opening;

an air bag inflator to inflate said air bag and having a flange;

a mounting plate attachable to a vehicle steering wheel, said mounting plate having an opening and a surface defining a recess adjacent the opening, said recess receiving said flange of said air bag inflator;

a bag ring having a central axis, said bag ring clamping said mounting portion of said air bag between said bag ring on one side of said mounting portion and said mounting plate and said flange of said inflator on an opposite side of said mounting portion; and only three fasteners substantially equally spaced in a circumferential array about the central axis of said bag ring and which are not diametrically opposed to one another, said three fasteners for securing said bag ring and mounting plate together to clamp said mounting portion.

10. The apparatus set forth in claim 9 wherein each of said fasteners comprises a stud fixed to said bag ring and extending in a direction substantially parallel to the central axis of said bag ring.

11. The apparatus set forth in claim 9 further including three openings formed in said mounting plate, each of said openings receiving a respective one of said fasteners.

12. The apparatus set forth in claim 11 further including three openings formed in said mounting portion of said air bag, each of said openings receiving a respective one of said fasteners to position and retain said mounting portion of said air bag relative to said mounting plate, inflator flange and bag ring.

* * * * *